FIG. 8
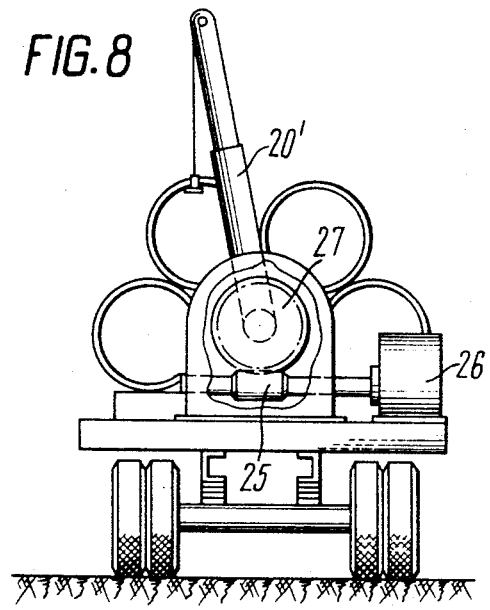
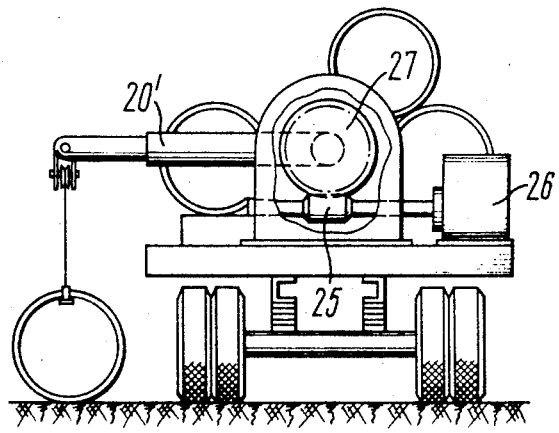
FIG. 9

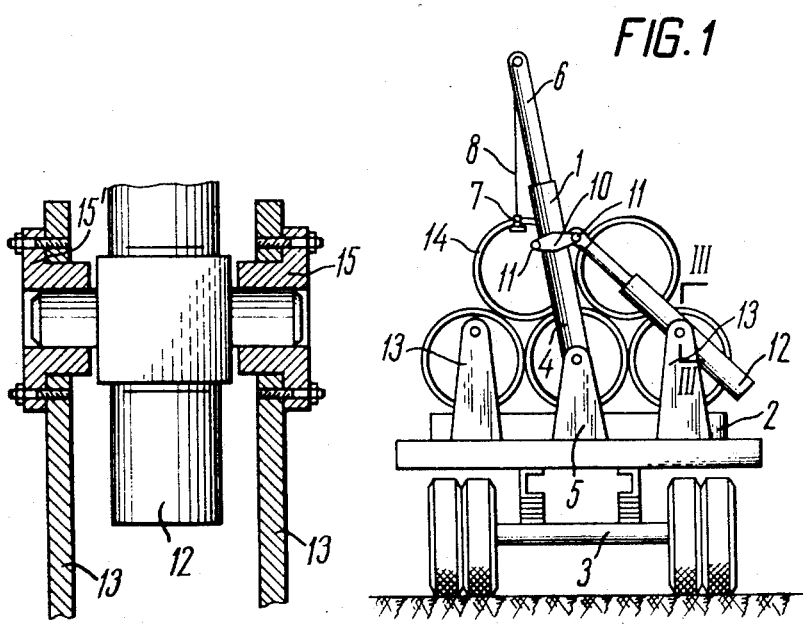
FIG. 1
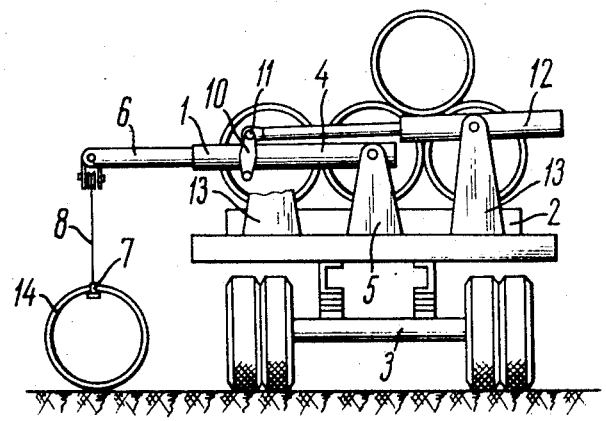
FIG. 3
FIG. 2

United States Patent Office 3,468,439
Patented Sept. 23, 1969

3,468,439
DEVICE FOR HANDLING LENGTHY LOADS, MAINLY INSULATION-COATED PIPES, TRANSPORTED BY TRUCK TRAINS
Vladimir Samsonovich Olitsky, Lesnaya ulitsa 8/12, kv. 1, Anatoly Zakharovich Mirkin, Ulitsa Svobody 4, kv. 68, and Nikolai Borisovich Shirokov, Zelenodolskaya 45, korpus 2, kv. 25, all of Moscow, U.S.S.R.
Filed May 25, 1967, Ser. No. 641,289
Int. Cl. B60p 1/48
U.S. Cl. 214—77                    2 Claims

ABSTRACT OF THE DISCLOSURE

Apparatus for the handling of insulation-coated pipes transported by truck trains in which rotatable load-lifting booms provided with a load-gripping means attached to the free end thereof are mounted on bolsters adjacent the ends of the truck train. Each of the booms is capable of rotation mainly in a vertical plane normal to the longitudinal axis of the truck train and each boom includes a stationary member and a member slidable into and out of the stationary member with the load-gripping means being carried by the slidable member.

---

This invention relates to load-lifting apparatus and mechanisms and, more particularly, apparatus for handling lengthy loads, mainly insulation-coated pipes, transported by truck trains.

Conventionally used apparatus for handling pipes are mounted on truck trailers and have a slewing lifting boom of a constant radius with a load-gripping appliance secured to its free end. The boom is installed in the center of the trailer on a turnable base which can be rotated through 360°.

The principal disadvantage of the known apparatus of this type is that they are not suitable for loading a relatively large amount of pipes onto a truck train because the lifting boom is installed in the center of the trailer. Thus, even when only one pipe is loaded onto the truck train, the boom slewing angle in the vertical plane is reduced. When unloading pipes, these known apparatus fail to grip the pipes over the entire width of the trailer deck.

In addition, load handling operations with the use of the known devices require considerable time because the load-gripping appliance must be brought exactly under the center of gravity of each pipe.

An object of this invention is to provide a load lifting apparatus which eliminates the above mentioned disadvantages.

The invention is aimed at providing such an apparatus for handling lengthy loads, mainly pipes and more specifically insulation-coated pipes transported by truck trains which, though relatively simple in design, ensures quick handling of loads and, at the same time, can be used as a pipe stacker.

In the accomplishment of the object of the present invention, the load-lifting booms are telescopic and are installed on at least two furthermost bolsters of the trailer, with each boom being capable of slewing mainly in a vertical plane normal to the longitudinal axis of the truck train.

In one of the possible embodiments of the present invention, it is expedient that the slewing of each boom be effected with the aid of a telescopic rod hinged at one of its ends to the bolster and at the opposite end to the boom. The hinges of the telescopic rod should preferably be sectional to enable the rod to be installed on either side of the boom.

In another possible embodiment of the present invention, it is desirable to effect the slewing of the boom by means of two telescopic rods installed on both sides of the boom on the bolster, with the telescopic rods being hinged to the trailer bolster directly at their lower ends, while their upper ends are connected to the boom through shackles having a common axis of rotation coinciding with the slewing axis of the boom.

In still another embodiment of the present invention, it is expedient to effect the slewing of each boom by means of a reciprocating toothed rack in mesh with a gear wheel rigidly secured to the boom, with the axis of the gear wheel coinciding with the slewing axis of the boom.

In a further embodiment of the present invention, it is desirable to effect the slewing of each boom by means of a rotatable worm in mesh with a worm wheel rigidly secured to the boom, with the axis of the gear wheel coinciding with the slewing axis of the boom.

The boom is preferably constituted by two cylinders fitted one inside the other, with the outer cylinder being hinged to the bolster and to the lower end of the power cylinder, while the inner cylinder is connected to the upper end of the power cylinder for moving the inner cylinder relative the outer cylinder.

The telescopic section of the boom is preferably provided with a cantilever arranged along the truck train, while the nontelescopic section of the boom is provided with a winch, with the wire rope from the winch being trained over a block sheave located on the end of the cantilever, and the wire rope carries a load-gripping appliance, preferably a hook provided with a clamp.

Other features and advantages of the invention will be apparent from the following description of exemplary embodiments of the invention, with reference being had to the accompanying drawings in which:

FIG. 1 is an end elevational view of an embodiment of an apparatus for handling pipes provided with one telescopic rod at the moment of gripping a pipe located on a truck train;

FIG. 2 is an end elevational view of the same apparatus at the moment of unloading the pipe onto the ground;

FIG. 3 is a view taken along the line III—III of FIG. 1, the view being on a somewhat enlarged scale;

FIG. 8 is an end elevational view of an embodiment of the apparatus incorporating a worm drive at the moment of gripping the pipe located on the truck train;

FIG. 9 is an end elevational view of the same apparatus at the moment of unloading the pipe onto the ground.

Figure 10:
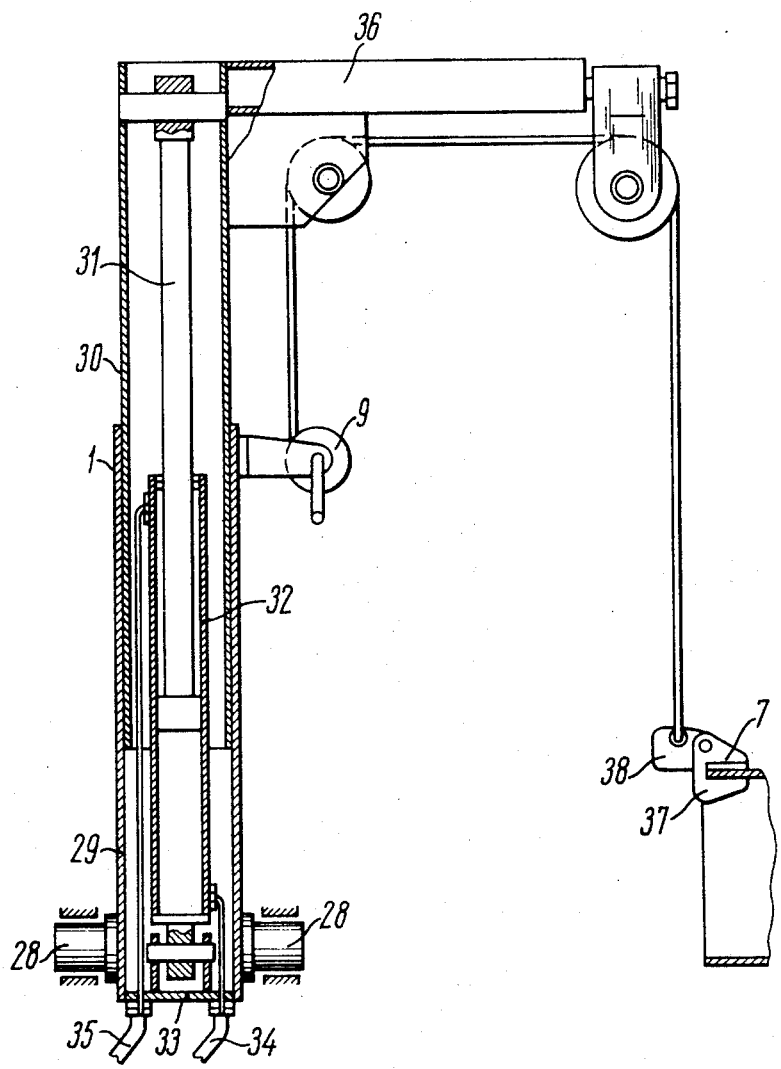
FIG. 10 is a fragmentary view, partly in elevation and partly in section of the boom.

The apparatus for handling pipes includes two telescopic booms 1 (FIG. 1), each mounted on one furthermost bolster 2 of a truck train 3 so as to be capable of turning in a vertical plane normal to the longitudinal axis of the truck train. Lower end 4 of the boom 1 is hinged to a bracket 5, while its upper end 6 is provided with a load-gripping appliance 7 suspended from a rope 8 wound on the drum of a winch 9 (FIG. 10). Fastened to the nontelescopic section of the boom 1 (FIGS. 1 and 2) is a board 10 with hinges 11 for connection with a telescopic rod 12 hinged to one of a pair of brackets 13 located on both sides of the bracket 5. In the course of the load handling, the hoisting and lowering of the boom 1 is achieved by extending the rod 12. When lowering pipes 14, the boom 1 (FIG. 2) is extended, which provides for comparatively small dimensions of the apparatus as well as for a considerable length of the area to be serviced. The winch 9 ensures a still greater maneuverability of the apparatus and makes it possible for the laying of pipes in trenches.

For handling loads located on both sides of the truck train, the telescopic rod 12 is removed from one bracket 13 and operably connected to the other. This is achieved with the aid of identical dismountable hinges 15 and 15' (FIG. 3) installed in the connection locations of the rod 12 to the boom 1 and the bracket 13.

Figure 4:
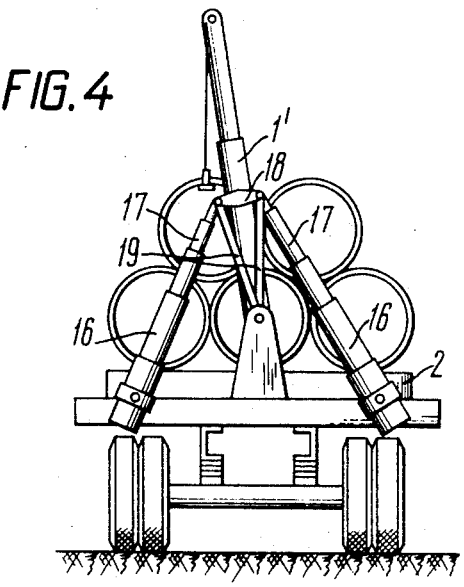
FIG. 4 is an end elevational view of an embodiment of an apparatus provided with two telescopic rods at the moment of gripping a pipe located on a truck train.
Figure 5:
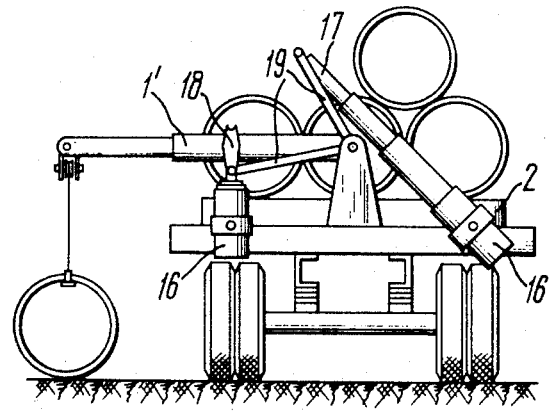
FIG. 5 is an end elevational view of the same apparatus at the moment of unloading the pipe onto the ground.

In another embodiment of the apparatus, telescopic rods 16 (FIG. 4) are installed on both sides of the boom 1'. Upper ends 17 of the rods 16 are not hinged to a board 18, as was the case in FIG. 1, but to shackles 19 whose axis of rotation coincides with the axis of rotation of the boom 1'. In the course of the load handling, the boom 1' (FIGS. 4 and 5) can rotate both towards the left-hand and the right-hand side of the truck train, as a result of extending one of the rods 16 and retracting the other rod. In this case, the second rod serves as a damper, while the shackles 19 ensure a constant trajectory of movement of the rods 16. This embodiment ensures a greater degree of maneuverability when ground servicing an area located on both sides of the truck train.

Figure 6:
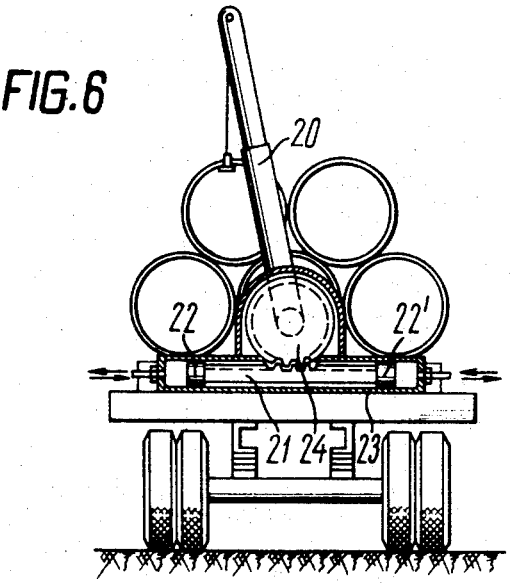
FIG. 6 is an end elevational view of an embodiment of the apparatus incorporating a toothed rack at the moment of gripping a pipe located on a truck train.
Figure 7:
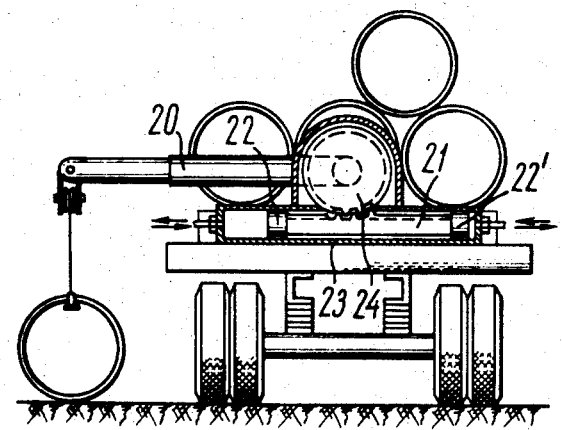
FIG. 7 is an end elevational view of the same apparatus at the moment of unloading the pipe onto the ground.

According to a third embodiment shown in FIGS. 6 and 7, telescopic booms 20 are rotated as a result of the movement of a toothed rack 21 connected to a piston 22 and 22' of an actuating hydraulic cylinder 23. The toothed rack 21 meshes with a gear 24 fixed to the boom 20, and the axis of rotation of the gear 24 coincides with the axis of rotation of the boom 20.

Load-lifting booms 20' (FIGS. 8 and 9) can be rotated by rotating a worm 25 by means of an electric motor or hydraulic motor 26. In this case, the worm 25 meshes with a worm wheel 27 fixed to the boom 20'.

The structural details of the load-handling booms are shown in FIG. 10. As seen in this figure, the boom 1 is provided with stub-axles 28 journalled in the bracket 5. The stub-axles 28 are welded to the lower end of a stationary cylinder 29. A telescopic or slidable cylinder 30 slides inside the nontelescopic cylinder 29. The cylinder 30 is extended from the cylinder 29 as a result of the movement of a rod 31 of an actuating hydraulic cylinder 32. The cylinder 32 is hinged at its lower end to a bottom wall 33 of the cylinder 29, and the rod 31 is hinged at its upper end to the top of the cylinder 30. The working liquid is supplied into the cylinder 32 through conduits 34 and 35. Welded to the upper end of the cylinder 30 is a bracket 36 arranged along the truck train 3. The load gripping appliance 7 includes a hook 37 provided with a clamp 38.

The invention is not to be confined to any strict conformity to the showings in the drawings but changes or modifications may be made therein so long as such changes or modifications mark no material departure from the spirit and scope of the appended claims.

We claim:

1. An apparatus for handling lengthy loads, particularly insulation-coated pipes transported by truck trains, comprising a bolster located adjacent each end of the truck train and extending transversely thereof, a rotatable lifting boom mounted on each bolster for rotation mainly in a vertical plane normal to the longitudinal axis of the truck train, each boom including a stationary member and a member slidable into and out of the stationary member, a load gripping means attached to the free end of the slidable member, and means for rotating each boom, said rotating means comprising two telescopic rods installed on both sides of said boom on said bolster, the lower ends of said telescopic rods being hinged directly to said bolsters, and the upper ends of said rods being connected by shackles having a common axis of rotation coinciding with the axis of rotation of said boom thereby ensuring a constant trajectory of movement of said rods.

2. The apparatus as claimed in claim 1, in which the slidable member of said boom is provided with a cantilever arranged along said truck train, and said stationary member of said boom is provided with a winch, a wire rope from said winch being trained over a block sheave at the end of said cantilever, and said wire rope having a load-gripping appliance.

References Cited

UNITED STATES PATENTS

| 2,771,197 | 11/1956 | Leffler | 214—77 X |
| 3,174,630 | 3/1965 | Tantlinger et al. | |
| 3,276,610 | 10/1966 | Thatcher | 214—77 |

GERALD M. FORLENZA, Primary Examiner

ROBERT J. SPAR, Assistant Examiner

U.S. Cl. X.R.

212—8